UNITED STATES PATENT OFFICE.

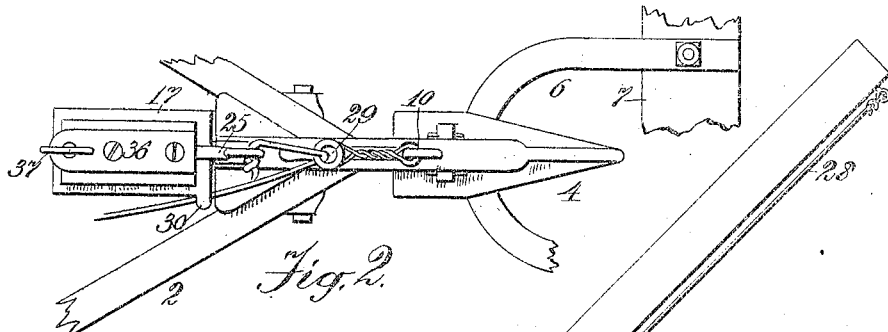
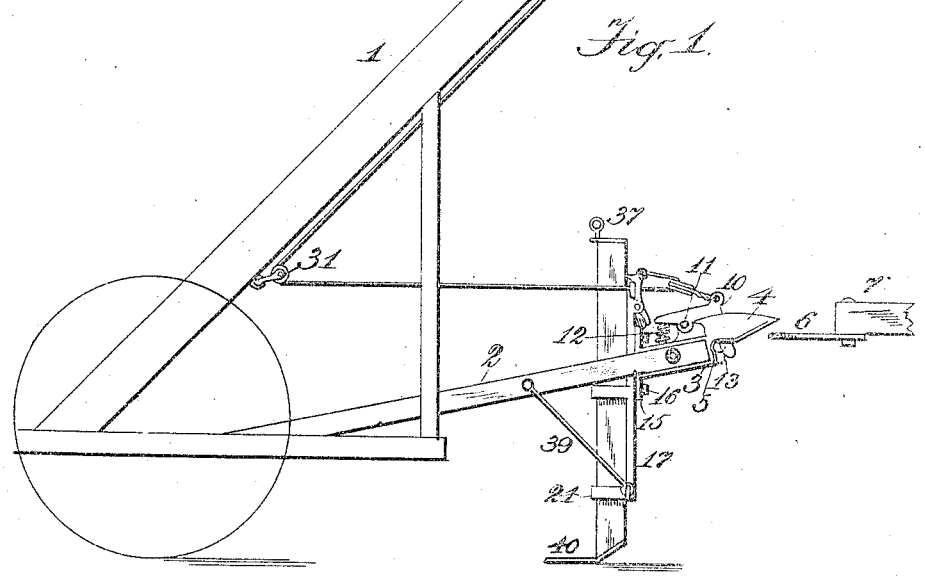
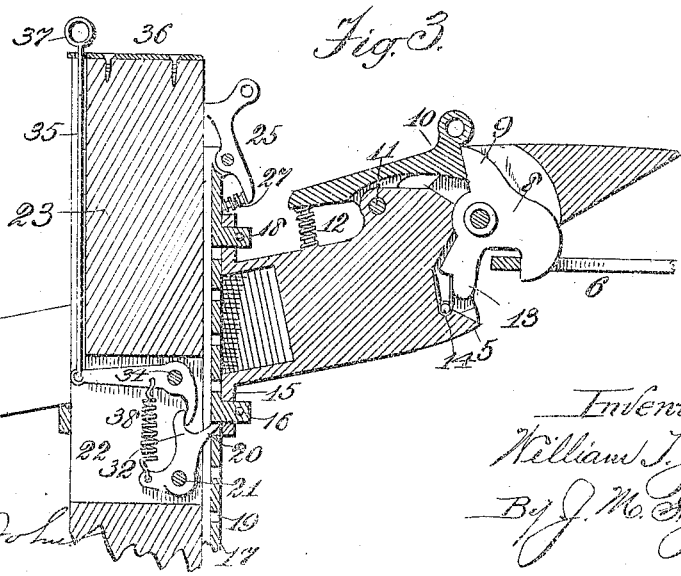

WILLIAM T. JONES, OF CEDAR RAPIDS, IOWA.

HAY-LOADER COUPLING.

943,024.

Specification of Letters Patent.   Patented Dec. 14, 1909.

Application filed January 24, 1908. Serial No. 412,523.

*To all whom it may concern:*

Be it known that I, WILLIAM T. JONES, a citizen of the United States, residing at Cedar Rapids, in the county of Linn and State of Iowa, have invented certain new and useful Improvements in Hay-Loader Couplings; and I do hereby declare the following to be a full, clear, and exact description of the invention, such as will enable others skilled in the art to which it appertains to make and use the same.

This invention relates to hay-loaders of the general type, which are attached to the rear of a wagon, and rake and deposit the hay thereon.

The object of the invention is to provide a simple, efficient and easily operated coupling whereby the wagon and hay-loader may be connected without any labor on the part of the operator.

The nature of the invention will clearly appear from the description and claims following, reference being had to the accompanying drawings, in which—

Figure 1 is a side elevation illustrating my improved coupling as applied to a hay-loader, the latter being shown diagrammatically and without any attempt to illustrate details of construction. Fig. 2 is a top view of the coupling and Fig. 3 is a central vertical section of the same.

Most hay-loaders are so constructed that the elevator which projects over the hayrack and deposits the raked hay thereon, has a considerably overhanging weight, usually more than can be conveniently lifted by one man, as is necessary in coupling the tongue of the hay-loader to the rear of the hay wagon. This invention is designed to facilitate this operation by providing a coupling so constructed that it is at all times in suitable position to connect with the hay wagon by simply backing the latter up against the hay-loader.

The mechanism embodying the invention will now be described, reference being had to the drawings wherein the different parts are designated by numerals.

Referring now to the drawings, 1 indicates a hay-loader elevator and 2 the tongue thereof. This is usually attached rigidly to the hay-loader, adjustably or otherwise, and when raised to suitable coupling position with the wagon, brings the hay-loader into proper position for work. Attached to this tongue is a coupling-head 3 having an upwardly inclined nose 4 and a downwardly extending shoulder 5 to receive the coupling-link 6 which is attached to the rear end of the hay wagon at some suitable point, such as the rear cross-bar of the hayrack 7. This link may be a simple stirrup, as more clearly shown in Fig. 2.

Pivoted in a coupling-head 3 is a hook 8 adapted to turn a little distance up and down to release or engage a coupling-link. The hook is held in coupling position by a shoulder 9 engaging the forward end of a pawl 10, pivoted at 11. This pawl is preferably provided with a spring 12 adapted to force the forward end downwardly and so insure engagement with the coupling-hook. Back of a finger 13 is mounted another spring 14 adapted to throw the coupling-hook forward and upwardly so as to hold it in open position whenever the pawl is disengaged. In coupling, the link strikes this finger, which at this time is in the position indicated in Fig. 1 and pushes it back to a point where the pawl may engage the coupling-hook, as shown in Fig. 3, in which position the link is securely held by the hook.

Provision is made for holding the tongue at any desired elevation, so that whenever the wagon is backed into coupling position the link will be at the proper level to engage the coupling head. This mechanism is best illustrated in Figs. 1 and 3. At the rear end of the coupling-head is a pair of lugs 15, pierced to receive studs 16 projecting forwardly from a vertical plate 17 and held thereon by suitable pins 18. This plate is pierced at 19 with a series of holes adapted to take the nose of a pawl 20, pivoted at 21 in a mortise 22, formed in a stick of timber 23 which serves as the supporting-leg for the tongue. This stick is mounted to slide in guide-stirrups 24 forming a part of the plate 17. At the upper end of this plate is pivoted a pawl 25 adapted to engage the front face of the leg and hold it by friction or by engagement with the mortise 22 if the leg be elevated that much. This pawl should have a spring 27 to insure suitable engagement with the leg. Connected with an arm of this pawl is a pull-cord 28 extending forward and through an eye 29 attached to the pawl 10. This cord passes thence back through an eye 30 near the upper end of the guide-plate and about a sheave 31 attached at some suitable point to the hay-loader and passing thence and fastening near the forward upper end thereof, as shown in Fig. 1. To disengage the pawl 20, the same is provided with a finger 32 which engages a lever 34. The long arm of this lever connects with a pull-rod 35, extending to the top of the leg and passing through a hole in a top-plate 36. This rod is provided with a suitable eye 37 by means of which the operator may lift it and with it the leg and elevate to any desired position. The pawl and lever are connected by a spring 38 which tends to press the pawl forwardly into engaging position with the guide-plate. The guide-plate is provided with a pair of brace-rods 39 connecting it with the tongue 2 and serving to brace and strengthen it.

In the operation of the device the tongue is first raised to a suitable position and connected with the hay wagon, which may be done by simply releasing the pawl 25 and raising the tongue to the proper elevation. In so doing the leg drops to the ground and is automatically locked in that position by the pawl 21. The operator then backs the hay wagon toward the hay-loader and the coupling is made automatically. He then, by the pull-rod 37, lifts the leg as high as may be necessary so as to clear obstructions and it is automatically locked in this lifted position. When it is desired to uncouple the loaded wagon from the hay-loader, the man on the load pulls the cord 28 which produces the double effect of releasing the pawl 25, which allows the leg to drop to suitable holding position for the tongue, and also of disengaging the pawl 10 so as to permit the wagon to uncouple from the hay-loader. It is evident that the tongue is thus maintained at a suitable elevation to reëngage the wagon when it is desired to couple them again. This is also true regardless of the conformation of the ground, as it is evident that the leg will only drop so far as to make contact with the surface of the ground, whether it be an elevation, hollow or level surface.

The leg is provided with a forwardly and upwardly inclined shoe 40 at its lower end, for the purpose of protecting the leg against accidental breakage. Should now the operator forget to pull up the leg free from the ground before starting the wagon the leg will simply drag along on the ground until the shoe strikes a stone or hillock, when it will be forced upwardly, and will thus automatically uncouple the loader from the wagon.

Having thus described my invention what I claim as new and desire to secure by Letters Patent is:

1. In a hay-loader, the combination with a coupling-head of a guide-plate attached thereto, a leg mounted to slide along said guide-plate, a pawl pivoted to said guide-plate and engaging with the guide-plate, means for engaging and disengaging said pawl, an auxiliary pawl pivoted to the guide-plate and adapted to engage the leg and means for engaging and disengaging said auxiliary pawl.

2. In a hay-loader, the combination of a coupling-head, having a coupling-hook and a pawl adapted to engage the same in coupling position, a guide-plate attached to said head, a leg adjustable along said guide-plate, means substantially as described to hold said leg at any desired position along said guide-plate, an auxiliary pawl adapted also to engage the leg and hold it in opposite position as regards the other pawl and means connecting with said auxiliary pawl and the coupling-hook pawl for releasing both thereof by a single act of the operator.

3. In a hay-loader, the combination of a coupling-head, a guide-plate attached thereto, a leg movable up and down along said guide-plate, a pawl to engage it and hold the guide plate at any desired elevation, a lever engaging the said pawl and a lift-rod connecting with said lever whereby the pawl may be disengaged and the leg lifted by the same act.

In testimony whereof I affix my signature in presence of two witnesses.

WILLIAM T. JONES.

Witnesses:
J. M. ST. JOHN,
N. P. McKEE.